INVENTOR.
URBAN URBANY
BY A.B.Bowman
ATTORNEY

Patented Sept. 6, 1932

1,876,182

UNITED STATES PATENT OFFICE

URBAN URBANY, OF SAN DIEGO, CALIFORNIA

TAMALE MOLD AND CONTAINER

Application filed February 10, 1931. Serial No. 514,893.

My invention relates to tamale molds and containers, and the objects of my invention are:

First, to provide a device of this class which functions as a mold for cooking the tamale, as well as a container for vending the same.

Second, to provide a device of this class which eliminates the need of using unsanitary, untidy corn husks for wrapping the tamale, and further eliminates the waste occasioned thereby.

Third, to provide a container for tamales which may be opened without the use of tools, yet provide ample protection for the tamale contained therein.

Fourth, to provide a container of this class, which, upon being opened, forms a pair of receptacles or dishes from which the tamale may be eaten, thus providing a container which is particularly useful when the tamales are eaten on picnics and the like.

Fifth, to provide a container and mold of this class which is sufficiently economical of manufacture that it may be sold with the tamale.

Sixth, to provide a mold and container for tamales which simulates the shape of the conventional tamale, and Seventh, to provide a novelly constructed tamale mold and container which is durable, sanitary and efficient in its action.

Figure 1:
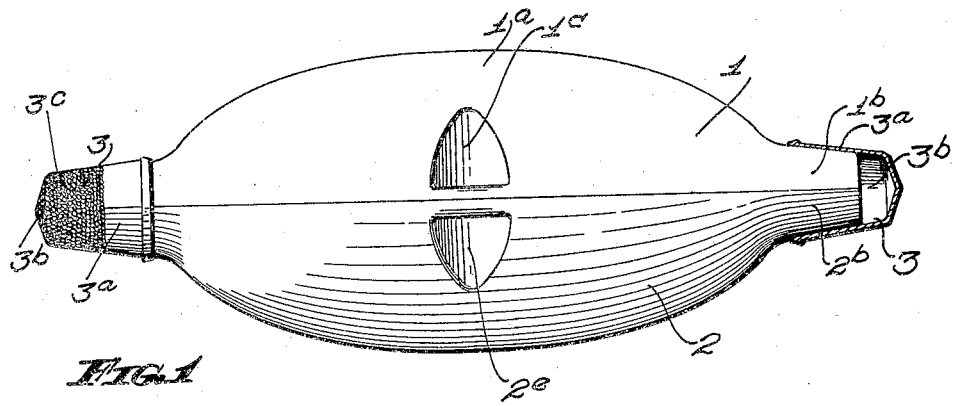
Figure 2:
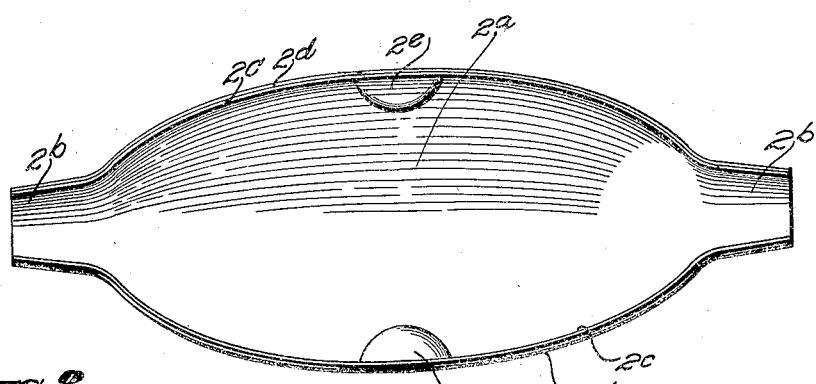
Figure 3:
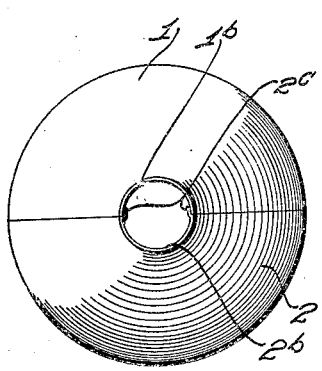
Figure 4:
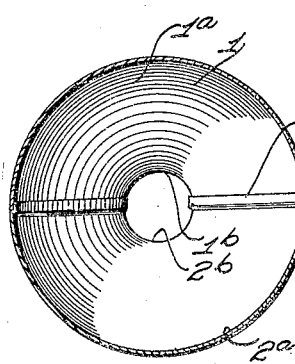
Figure 5:
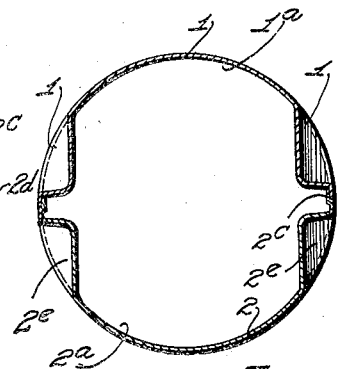
Figure 6:
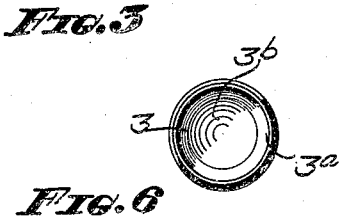

With these and other objects in view as will appear hereinafter, my invention consists of certain novel features of construction, combination and arrangement of parts and portions as will be hereinafter described in detail and particularly set forth in the appended claims, reference being had to the accompanying drawing and to the characters of reference thereon which form a part of this application, in which:

Figure 1 is a side elevational view of my novel tamale mold and container with parts and portions shown in section to facilitate the illustration; Fig. 2 is a plan view of one of the tamale mold halves or shells; Fig. 3 is an end elevational view of my tamale mold with the end member or cap removed; Fig. 4 is a sectional view through 4—4 of Fig. 1 showing parts and portions in elevation; Fig. 5 is a sectional view through 5—5 of Fig. 1, and Fig. 6 is an end view of one of the end members or collars.

Similar characters of reference refer to similar parts and portions throughout the several views of the drawing.

Shell members 1 and 2, and end or cap members 3 constitute the principal parts and portions of my novel tamale mold and container.

The tamale mold comprises a pair of complementary container shells 1 and 2. The two shell members when in their normal relation form a tubular container of circular cross-section as shown in Figs. 3, 4, and 5. Viewed longitudinally, the two shell members together simulate the shape of the conventional tamale, having their greatest diameter at their central portions designated 1a and 2a respectively, and diminishing in cross-section each way therefrom until at the end they form neck portions designated 1b and 2b. The outer surfaces of the neck portions 1b and 2b, when complementary, are in substantially the form of a truncated cone, being slightly tapered.

The neck portions are open at their end as indicated by A, and are adapted to be closed by end member or caps 3; two end members being provided which are identical in construction.

These end members are provided with a tapered annular portion 3a conforming to the taper of the neck portions 1b and 2b, and an end portion 3b. It is found that the common thimbles of economical construction are satisfactory to be used as caps of the container.

The knurling or roughened portions designated 3c of the thimble form convenient gripping means when desiring to open the container.

The edge of the semi-circular shell 2, adjacent the edge of the shell 1 is provided with an inwardly offset rim 2c extending along both sides, forming shoulders 2d against which edges of the shell 1 rest.

In order to facilitate the separation of the semi-circular shells 1 and 2, these shells may be provided with depressions 2e and 1c respectively which are adapted to receive the fingers.

My mold and container is used as follows: Each shell member is filled with the tamale material, preferably first lining the mold with wax paper or the like. The shells are then put together and the cap members are placed over the neck portions. The mold with the tamale material therein is cooked in the usual manner and then vended, hot or cold as desired, while still in the container. Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a tamale mold and container, a pair of complementary shell members together simulating a tapering ended tamale, there being provided reduced open end portions, and closed ended cap means fitted over said end portions for closing said open end portions and holding said shell members in their complementary relation.

2. In a tamale mold and container, a pair of complementary shell members together simulating a tapering ended tamale, there being provided reduced open ended end portions, cap means fitted over said end portions for holding said shell members in their complementary relation, and grip means associated with said shell members for facilitating separation of said shell members.

3. In a tamale mold and container, a pair of semi-circular, complementary shell members, said shell members having their largest diameter at their central portion and diminishing therefrom towards their end portions, cap means coacting with the end portions of said shell member for retaining said shell members in complementary relation, and grip means associated with said shell members for facilitating separation of said shell members.

4. In a tamale mold and container, a pair of complementary shell members, said shell members having their largest diameter at their central portion and diminishing therefrom towards their end portions, together forming an open ended tubular container, said tubular container being constricted at its ends forming neck portions, and cap members arranged to fit over said neck portions for closing said container and retaining said shell members in their complementary relation.

5. In a tamale mold and container, a pair of complementary shell members, said shell members having their largest diameter at their central portion and diminishing therefrom towards their end portions, together forming an open ended tubular container, said tubular container being constricted at its ends forming neck portions, and cap members arranged to fit over said neck portions for closing said container and retaining said shell members in their complementary relation, said shell members provided with indentations forming grip means for facilitating separation of said shell members.

6. In a device of the class described, a pair of complementary shell members, together forming an open ended, tubular container, the rim of one of said shell members offset forming a shoulder, the other of said shell members arranged to telescope said one shell member until its rim engages said shoulder, the ends of said shell members being tapered and constricted, and cap members including tapered portions arranged to fit over the tapered, constricted portions of said shell members and retain said shell members in their complementary relation.

7. A tamale mold and container, consisting of a pair of complementary shell members substantially semi-circular in cross-section and provided with constricted open ended neck portions at its opposite ends, and caps fitting over the open ends of said neck portions.

8. A tamale mold and container, consisting of a pair of complementary shell members substantially semi-circular in cross-section and provided with constricted open ended neck portions at its opposite ends, said shell members when placed with their open ends together forming a shell member simulating a tamale, and caps fitted over the opposite ends closing said open ends and securely holding said members together.

In testimony whereof, I have hereunto set my hand at San Diego, California this 2nd day of February 1931.

URBAN URBANY.